March 20, 1956    R. C. WEIDE    2,739,194
POWER CIRCUIT CUT-OUT ATTACHMENT
Filed June 3, 1952    2 Sheets-Sheet 1

Inventor
Rudolph C. Weide
By
Willits, Helmig & Baillio
Attorneys

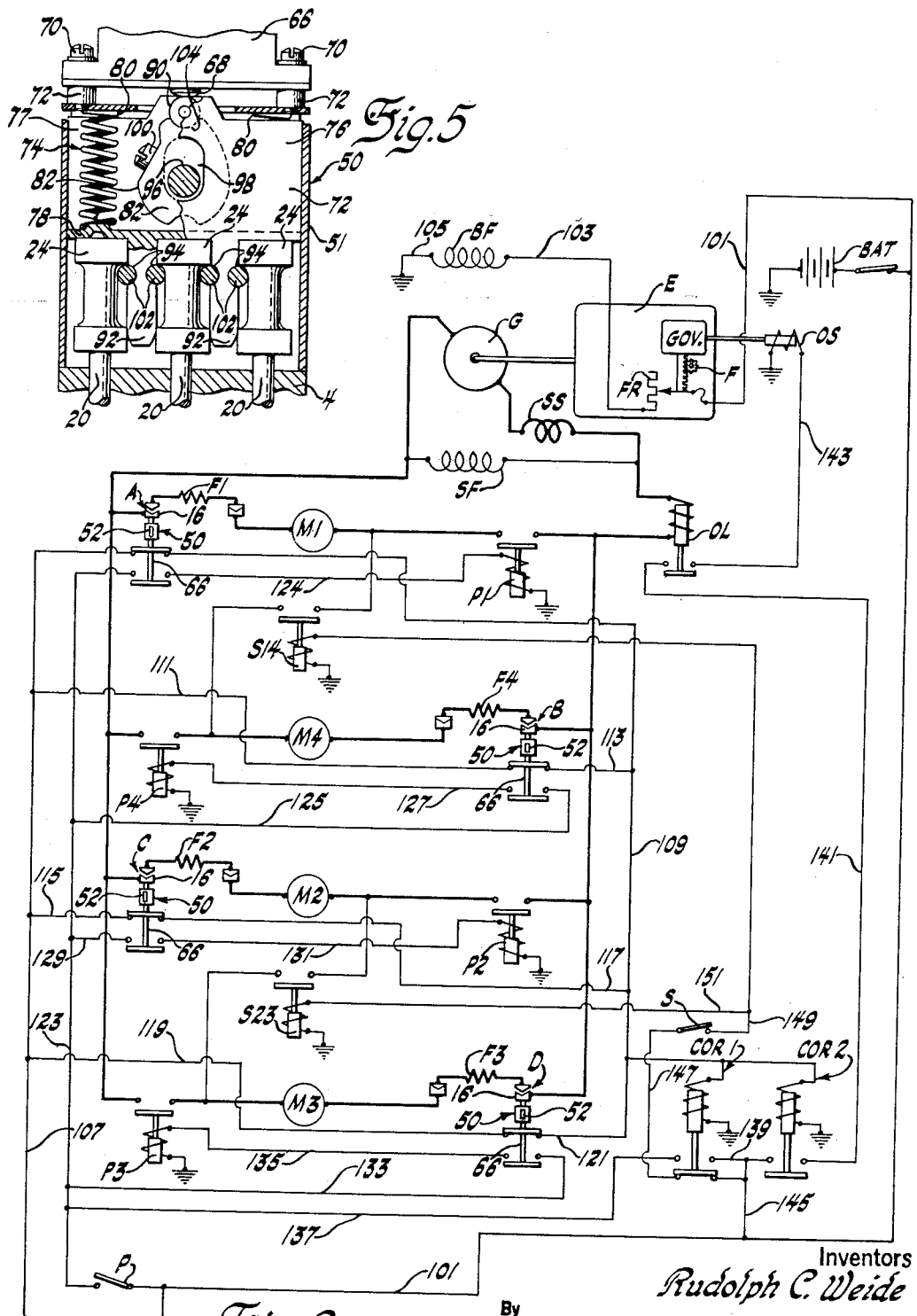

United States Patent Office 2,739,194
Patented Mar. 20, 1956

2,739,194

POWER CIRCUIT CUT-OUT ATTACHMENT

Rudolph C. Weide, La Grange, Ill., assignor to General Motors Corporation, Detroit, Mich., a corporation of Delaware Application June 3, 1952, Serial No. 291,426

10 Claims. (Cl. 200—8)

This invention relates generally to electrical switch mechanisms and more particularly to electrical switch mechanisms used in conjunction with the reversing switches on electrically powered vehicles. The invention will be described in connection with the reversing switches used on diesel electric locomotives. It should be understood, however, as the description proceeds, that the invention is not limited to electro-motive power only, but has a much wider field of application.

In the diesel-electric field, it is well known that a main generator is driven by a diesel engine to supply electrical current to a plurality of traction motors geared to axles that turn the driving wheels of a locomotive. It is also well known that the direction of these locomotives is reversed by means of a reversing switch commonly known as the reverser, which upon being thrown, simultaneously reverses the current flow through the fields of the traction motors.

The reverser generally constitutes a pneumatically operated rotary multiple pole switch provided with terminals to which the main generator, the fields of the traction motors and the armatures of the traction motors are directly or indirectly connected. Also a part of the reverser are sets of stationary contact tips for each traction motor which may be connected in different combinations by means of bus bars on the rotating portion.

In multiple pole switches such as the reverser described above, there often arise occasions when it is desirable to prevent the completion of only one of the several circuits normally closed by such a switch. For example, if a traction motor on a locomotive should become defective and no longer be capable of supplying motive power, it would become most urgent to isolate such a motor from the power circuit connecting the main generator and the traction motors together to prevent the possibility of short circuiting and to relieve the resulting drag on the other traction motors. When a traction motor is isolated, however, the main generator may become overloaded and therefore it becomes necessary to provide switching means used in combination with an additional circuit to correct or prevent such overloading.

It, therefore, becomes an object of this invention to provide a switching mechanism to be used in combination with a multiple pole switch and the circuits normally closed by the multiple pole switch, which will prevent the completion of one of said circuits when said multiple pole switch is closed.

It becomes a further object of this invention to provide a switching mechanism to be used in combination with a multiple pole switch and the circuits normally closed by the multiple pole switch, which will prevent the completion of one of said circuits and at the same time operate an additional circuit adapted to compensate for certain changes which must take place when said normally closed circuit is not completed.

It becomes a further object of this invention to provide a switching attachment used in combination with an electrical switch having a pair of contacts that may be closed, which when operated retracts a contact so that no electrical connection is made between the contacts when the switch is in its closed position.

It becomes a further object of this invention to provide on an electric locomotive a novel combination of a multiple pole reverser with manually accessible circuit cut-out attachments on each pole compartment which when operated serve to isolate the traction motors from the power circuit of the locomotive.

It becomes a further object of this invention to provide a mechanism for setting up a special low-voltage control system which takes care of the necessary changes in the heavy current power circuit after one or more traction motors have been disconnected.

It becomes a further object of this invention to provide an attachment which uses no additional copper, is simple and inexpensive to manufacture, and will readily adapt itself to equipment currently in use.

In the drawings:

Figure 5 is a cut-away front view showing the internal portions of the attachment with the mechanism in a retracting position.

Figure 6 is a schematic diagram of the power and low-voltage circuits for a diesel-electric locomotive and serves to illustrate one important use of the invention.

Figure 1:
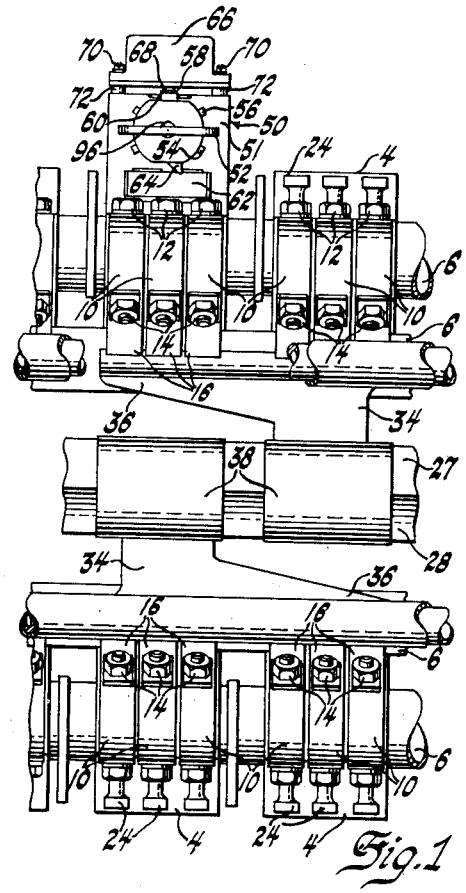
Figure 1 is a front view of one of the pole compartments provided on a reversing switch for a diesel-electric locomotive.
Figure 2:
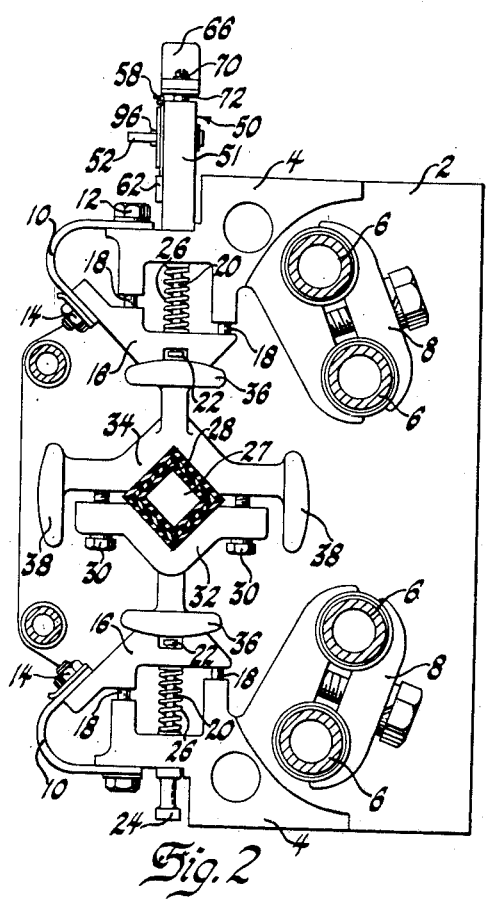
Figure 2 is an end view of the pole compartment shown in Figure 1.

Referring now to Figure 1 and Figure 2 one pole compartment of a reversing switch is shown. Also shown is a contact carrier block 2. Attached to the contact carrier block are contact carriers 4. These contact carriers 4 are rigidly attached to the contact block 2 by means of insulated rods 6 and clamping assemblies 8. Means not shown are provided for attaching conductor cables to the contact carriers 4. Also attached to each contact carrier 4 by means of bolts 12 are three flexible conductors 10. One end of each flexible conductor 10 is connected to a contact tip 16 by a bolt-nut assembly 14. These contact tips 16 are in sets of three and are flexibly mounted on their contact carriers 4 by means of the guide pins 18. The guide pins 18 allow a certain amount of movement between the contact carriers 4 and the flexible contact tips 16. The extent of this movement is controlled by connecting rods 20, which are threaded to studs 24. On one end of each connecting rod 20 is an abutment 22, which retains a contact tip 16 against the pressure of helical spring 26 located between each contact tip 16 and its contact carrier 4. A shaft 27 adapted to rotate in supports not shown is centered between the contact tips 16. The shaft is provided with insulation sheets 28. Fastened to the shaft by means of bolts 30 and brackets 32 are bus bars 34. Each of these bus bars 34 is provided with a long segment 36 and two short segments 38 for engaging the contact tips 16.

It should be understood at this point that two bus bars are required for each pole compartment of the reverser; and one pole compartment having four sets of contact tips is required for each traction motor. Two sets of contact tips are connected to opposite sides of the main generator and the other two sets of contact tips are connected to opposite sides of the field winding of the traction motor. It can easily be seen that if each of the two sets of contact tips 16 which are directly opposed are connected together by means of the short bus bar segments 38, the current will flow through the traction motor in one direction; and if each of the two sets of tips 16 adjacent to each other are connected by the long bus bar segments 36, the current will flow in an opposite direction. The position of the rotary portion of the reverser, therefore determines which way the current will flow through the field of the traction motor and, naturally, which way the motor will rotate.

Figure 3:
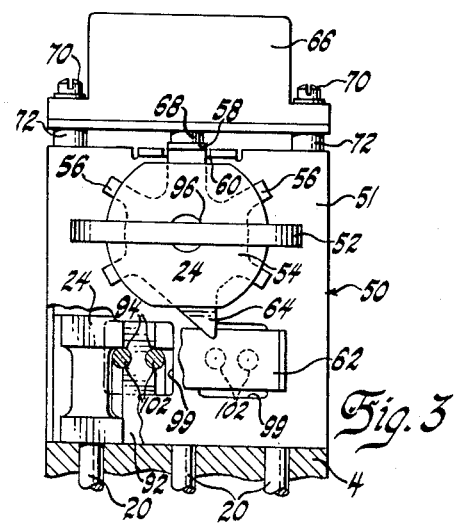
Figure 3 is a front view of the switching mechanism adapted to be used upon the reverser to retract one set of stationary contacts and also operate the low-voltage control system.

Referring now to Figures 1, 2, 3, 4 and 5, the new means for retracting one set of the contact tips 16 will be described. As has already been set forth, Figure 1 shows an assembled view of the power circuit cut-out attachment 50 attached to the stud members 24 and carrying the switch for the low-voltage circuit control. Figure 2 shows an endwise view of the same attachment. In Figure 3, it is seen that the attachment 50 includes a housing 51, an operating handle 52, a lock 54 provided with fingers 56, a spring detent 58 normally secured in a recess 60 in the housing 51, and a key bar 62 normally maintained in position against the outside of the housing 51 by the angular finger 64. The key bar 62 consists of a flat piece having lateral key pins 102 attached thereto which fit into the two holes 99 located on one side of the housing 51.

Attached to one end of the housing 51 by screws 70 and spaced therefrom by spacers 72 is a low-voltage control switch 66. The low-voltage control switch is provided with a button 68, which in the position shown in Figure 4 closes a first set of contacts and opens a second set, and when in the position shown in Figure 5 opens the first set of contacts and closes the second set. This low-voltage control switch is a well known double throw multiple pole switch for opening and closing two separate circuits. Its function will be more clearly understood in connection with the discussion of the schematic diagram shown in Figure 6.

Figure 4:
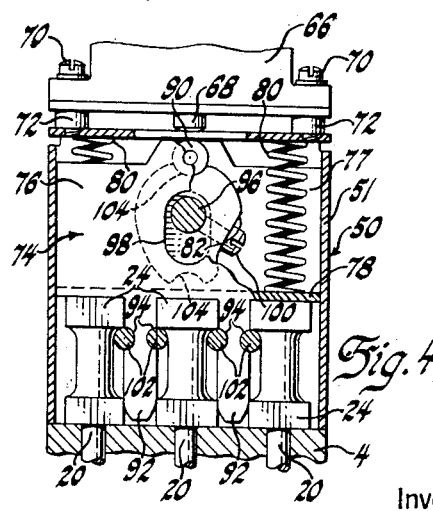
Figure 4 is a cut-away front view showing the internal portions of the attachment with the mechanism in a non-retracting position.

Referring now to Figures 4 and 5, it is seen that located within the housing 51 is a contact lifter 74 which is essentially U-shaped in form, being made up of two sides 76 and 77 and an end section 78. Located within the contact lifter 74 are two springs 80, a cam 82 and a roller 90 secured between the two sides 76 and 77 and adapted to roll on the outer surface of the cam 82. Two prolongations 92 are provided on each of the sides 76 and 77 of the contact lifter. Each of these prolongations 92 has two indentations 94. Also a part of the assembly is a shaft 96 rigidly attached to the operating handle 52 and retained in holes drilled in each side of the housing 51. This shaft passes through elongated holes 98 in the two sides of the contact lifter 74 and has the cam 82 rigidly attached to the shaft by means of the set screw 100.

The assembly and operation of the attachment 50 is as follows: The spring detent 58 is removed from the recess 60 and turned in a counterclockwise direction so that the angular finger 64 no longer engages the flat portion of the key bar 62. The key bar is removed from the assembly. The attachment is then placed over three of the studs 24 with the prolongations 92 extending between the studs. The key bar 62 is replaced so that the key pins 102 engage the under side of the studs 24 as well as the indentations 94 provided on the prolongations 92. The key bar is then again locked in place by turning the lock in a clockwise direction so that angular finger 64 engages the top of the key bar and spring detent 58 again resides in the recess 60. The attachment is now assembled for operation. When it is desired to disconnect any one of the traction motors, the operating handle 52 is normally turned through an angle of 180 degrees. This turning of the operating handle 52 also turns the shaft 96 to which the cam 82 is rigidly attached by the set screw 100. It is seen then that the cam 82 is also turned through an angle of 180 degrees. The cam surface will force the roller 90 upward or toward the button 68 of the low-voltage control switch. Since the roller 90 is connected or attached to the cam lifter 74, the cam lifter will be moved in a direction to oppose the pressure of springs 80 and will further compress them. Since the fingers 92 are now operatively connected to the studs 24 by means of the pin fingers 102 on the key bar the studs 24 also will be drawn upward or out of their normal position, thereby retracting the contact tips 16 to which the studs are attached by the connecting rods 20 and the abutments 22. The roller 90 at the same time will depress the button 68 operating the low-voltage control switch. Recessed contours 104 in the cam will maintain the attachment in either the retracted or contact positions.

Referring now to Figure 6, an important utilization of the attachment in combination with a reverser is seen. The schematic diagram of Figure 6 discloses a main generator G which is driven by the diesel engine E. The main generator G is a compound generator of well known construction having a shunt field SF, a series field SS and a battery field BF. The diesel engine E is provided with an engine driven governor GOV of conventional type having speed setting means not shown. The engine fuel regulator F a and generator field rheostat FR are connected to and operated by the governor GOV to maintain the speed, load and power output of the engine and generator power plant at any one of a plurality of constant values depending upon the governor's speed setting, in a well known manner. The engine driven governor GOV is provided with an over-riding solenoid OS which when energized operates a plunger to override the governor and reduce the power output supplied by the generator G to the traction motors.

The battery field BF of the generator G is separately excited by means of the battery BAT, one side of which is shown grounded. One side of the battery field is also shown as being gounded. The battery field is connected to the battery BAT by the conductor 101, the field resistance FR, and conductors 103 and 105.

Connected to the main generator by means of the heavy lines shown in the schematic diagram are four traction motors M-1, M-2, M-3 and M-4. Also connected in this circuit between the main generator and the traction motors is an overload relay OL which is a current relay of a well known type. Each of the traction motors shown in the heavy power circuit drives an axle to which traction wheels not shown are attached. Shown connected in series with each of the traction motors are motor field windings F-1, F-2, F-3, and F-4. Also shown in the power circuit are the normally open power contacts of series and parallel switches S-14 and S-23 and P-1, P-2, P-3 and P-4. Included in the power circuit in series with the traction motors are repeated pole compartments of the reversing switch designated generally by A, B, C and D. Each of these compartments includes the retractable contact tips 16, the new attachment 50 and the low-voltage control switch 66, all of which have been discussed above. In Figure 6 the retractable contact tips 16 for each pole compartment are shown in the retracted position for illustrative purposes only since in normal operation with all traction motors running the contacts would not be retracted.

It will be seen in normal operation of the locomotive that the power contacts of the series parallel switches S-14 and S-23, which connect the traction motors in series parallel relation across the main generator G, may be closed by suitable means which close the series switch S in a conventional and well known manner. By closing series switch S current may flow from the battery BAT through conductors 101 and 145, closed contacts of a cut-out relay COR 1, conductor 147, the series switch S, conductors 149 and 151, into the coils of the series switches S-14 and S-23 respectively, energizing them and causing their power contacts of close. This connects the traction motors in series-parallel relation across the main generator G. Transition from series-parallel to parallel connection of the traction motors across the main generator G may be accomplished by opening the series switch S and closing the parallel switch P. Current may then flow from the battery BAT through the conductor 101; parallel switch P; conductor 123; conductors 125, 129 and 133; the sets of normally closed contacts of the low voltage control switches 66; and the conductors 124, 127, 131 and 135 into the coils of the parallel switches P-1, P-4, P-2 and P-3 respectively. These coils when energized cause the contacts of the parallel switches to close and connect the traction motors in parallel with the main generator G.

Now, if for some reason, one of the traction motors should become defective and it is desired to disconnect the traction motor from the power circuit, this may be accomplished by manually turning the operating handle 52 of the corresponding power circuit cut-out attachment through 180 degrees. When the operating handle 52 is turned through the aforementioned angle the contact tips 16 are retracted so that the contact tips on the reverser connected to the field of the defective traction motor no longer can be connected to one side of the generator G. At the same time that the flexible contact tips 16 are retracted, the normally closed set of contacts in the low voltage control switch 66 is opened and the normally open set is closed. By opening the normally closed set of contacts on switch 66 any energization of the corresponding parallel switch is prevented and the motor is completely isolated from the main generator and one of the important functions of the power circuit cut-out attachment used in combination with the reverser has been accomplished.

Returning again to Figure 6, it will be seen that current may now flow from the battery BAT through the conductor 101; the conductor 107; one of the conductors 111, 115, 119 depending on which attachment has been actuated; the now closed contacts of the corresponding low-voltage control switch 66; one of the corresponding conductors 113, 117, 121 again depending on which attachment has been actuated; conductor 109; and into the coils of relays COR 1 and COR 2. Energization of the coil of relay COR 1 opens a normally closed set of contacts, cutting off the series switch S from the battery BAT, and closes a normally open set of contacts. A normally open set of contacts is closed by energization of the coil of relay COR 2. Current may now flow from the battery through conductor 101, conductor 145, conductor 139, the now closed contacts of relay COR 1, conductors 137 and 123, the normally closed contacts of the remaining low-voltage control switches 66 and into the corresponding windings of the remaining parallel switches. The energization of these windings causes the remaining traction motors to be connected in parallel across the generator G.

When one of the traction motors is cut out of the power circuit and the remaining motors are connected in parallel an excessive amount of current flows in the power circuit and through the generator G which energizes the coil of the over-load relay OL and closes its power contacts. Since the contacts of relay COR 2 are also closed, current may now flow from the battery BAT through conductors 101, 145, 139, the now closed contacts of relay COR 2, conductor 141, the now closed contacts of the over-load relay OL, the conductor 143, and into the coil of overriding solenoid OS. The overriding solenoid operates the plunger on the governor and runs the maximum field resistance FR into the battery field circuit to de-excite the main generator G and prevent any further overload and thereby accomplish the second important function of the power circuit cut-out attachment.

It will be appreciated that this new power circuit cut-out attachment is a multi-purpose invention capable of many uses. For example, by employing said attachment in combination with the above described reverser and circuits, several operations were accomplished by the use of a single unit, namely, the contact tips of one side of the traction motor were retracted separating the traction motor from one side of the generator, the contacts of a parallel switch were opened disconnecting the other side of the traction motor from the generator, and a low-voltage control circuit was closed connecting the remaining traction motors in parallel and causing the battery field of the generator to be de-excited so that the generator could no longer be over-loaded.

I claim:

1. An electrical switch assembly having a stationary contact and a movable contact, said stationary contact being supported on a stationary contact carrier and biased by resilient means acting between said stationary contact and said carrier, a break position for said movable contact in which position said movable contact is removed from said stationary contact, and a make position for said movable contact in which position said movable contact resiliently engages said stationary contact, and manually operable mechanical means for retracting said stationary contact to a position removed from said movable contact when said movable contact is in said make position including a cam follower attached to said stationary contact, a rotatable cam supported on said carrier and engageable with said follower, and an operating handle secured to said rotatable cam.

2. An electrical switch assembly having a stationary contact and a movable contact, said stationary contact being movably supported by a stationary contact carrier and biased by resilient means acting between said stationary contact and carrier, a break position for said movable contact in which position said movable contact is removed from said stationary contact, and a make position for said movable contact in which position said movable contact resiliently engages said stationary contact, and manually operable mechanical means for retracting said stationary contact to a position removed from said movable contact when said movable contact is in said make position including a cam following roller attached to said stationary contact, a rotatable cam supported on said carrier and engageable with said roller, and an operating handle secured to said rotatable cam.

3. In an electrical switch assembly, a stationary contact having a stud thereon, a movable contact, a break position for said movable contact in which position said movable contact is removed from said stationary contact, a make position for said movable contact in which position said movable contact engages said stationary contact, an attachment for retracting said stationary contact to a position removed from said movable contact when said movable contact is in said make position, said attachment having a finger adapted to be locked to said stud, and cam means forming a part of said attachment and operably connected to said finger, said cam means having at least two positions, one position in which said finger is extended and one position in which said finger is retracted, and means for turning said cam to either of said extended or retracted positions.

4. In an electrical switch mechanism in combination with a multiple pole multiple throw switch having two pairs of opposed flexible stationary contacts, one of said pairs being movably supported by a stationary contact carrier and biased by a resilient means acting between the contacts of the one of said pairs and said carrier, the said multiple throw switch being of the rotary type and having rotating contacts which in a make position engage said stationary contacts and in a break position are removed from said stationary contacts, and mechanical means for retracting the one of said pairs of stationary contacts to a position removed from said rotating contacts when said rotating contacts are in said make position including a cam follower attached to the one of said pairs of stationary contacts, a rotatable cam supported on said carrier and engageable with said cam follower, and an operating handle secured to said rotatable cam.

5. In an electrical switch mechanism in combination with a multiple pole multiple throw switch having two pairs of opposed flexible stationary contacts, the said multiple throw switch being of the rotary type and having bus bar segments attached thereto which in a make position for said switch engage said stationary contacts and in a break position for said switch are removed from said stationary contacts, and mechanical means for retracting one of said stationary contacts to a position removed from said bus bar segments when said switch is in said make position, said mechanical means comprising studs attached to one of said stationary contacts, a housing, a contact lifter provided in said housing and having key engaging means attaching said contact lifter to said studs, and a cam having a surface operable on said contact lifter, said surface having a position which removes one of said stationary contacts from one of said bus bars when said switch is in said make position.

6. In an electrical switch mechanism, in combination with a pair of opposed rotary segment bus contacts of rigid assembly, a means for rotating said assembly, two pairs of opposed flexible stationary contacts mounted outside of the circular path taken by said rotary bus contacts and engaging said rotary bus contacts when said rotary bus contacts are in a make position, and means for retracting said stationary contact members comprising stud members fastened to said stationary contacts and cam means operatively connected to said stud members for retracting said stationary contact members to a position removed from said segment bus contacts when said segment bus contacts are in said make position.

7. An electrical switch having a stationary contact and a movable contact, said stationary contact being movably supported by a stationary contact carrier and biased by resilient means acting between said stationary contact and carrier, a break position for said movable contact in which position said movable contact is removed from said stationary contact, and make position for said movable contact in which position said movable contact engages said stationary contact, means for retracting said stationary contact to a position removed from said movable contact when said movable contact is in said make position said means including a cam following roller attached to said stationary contact and a rotatable cam supported on said contact carrier and engageable with said roller, and an auxiliary switch engagable with and operable by said roller being cammed to different positions by said rotatable cam.

8. In an electrical switch mechanism, a pair of segment bus contacts rigidly attached to a rotary member, driving means for rotating said member through a limited angle in either direction about an axis, a contact carrier, two pairs of flexible stationary contacts mounted longitudinally along and parallel to said axis on said contact carrier, each of said pair of contacts being located equidistant from said axis and in opposition to each other, said pair of segment bus contacts engaging said pairs of stationary contacts when rotated through said limited angle in either direction, and manually operated mechanical means for retracting one of said pairs of flexible stationary contacts out of engagement with one of said segment bus contacts when said segment bus contacts have been rotated through said limited angle in either direction including a cam follower attached to the one of said pairs of stationary contacts, a rotatable cam supported on said carrier and engageable with said follower, and an operating handle secured to said rotatable cam.

9. In combination with a reverser for electrically driven vehicles, a contact carrying block, a set of flexible stationary contacts attached to said block, a set of movable contacts fastened to a rotatable member and adapted to rotate into and out of engagement with said stationary contacts, and manually operated means attached to one of said stationary contacts and adapted to remove one of said stationary contacts from a position where it normally engages with one of said movable contacts when said movable contacts are in engagement with said stationary contacts said means including a cam follower attached to the one of said stationary contacts, a rotatable cam supported on said block and engageable with said cam follower, and an operating handle secured to said rotatable cam.

10. In an electrical switch mechanism in combination with a rotary segment bus contact of rigid assembly, a means for rotating said assembly, a contact carrier, a flexible stationary contact resiliently mounted on said carrier outside of the circular path taken by said rotary bus contact and resiliently engaging said rotary bus contact when said rotary bus contact is in a make position, and manually operable mechanical means for retracting said stationary contact comprising a cam follower fastened to said stationary contact a rotatable cam supported on said carrier and engaging said cam follower, and an operating handle secured to said rotatable cam for retracting said stationary contact to a position removed from said segment bus contact when said segment bus contact is in said make position.

References Cited in the file of this patent

UNITED STATES PATENTS

| 1,276,110 | Rasmussen | Aug. 20, 1918 |
| 1,702,035 | Berthold | Feb. 12, 1929 |
| 2,448,284 | Staples et al. | Aug. 31, 1948 |
| 2,516,198 | Frier | July 25, 1950 |
| 2,594,181 | Kliegl et al. | Apr. 22, 1952 |
| 2,624,029 | Lillquist | Dec. 30, 1952 |

FOREIGN PATENTS

| 200,132 | Great Britain | July 2, 1923 |